Patented July 29, 1952

2,605,283

UNITED STATES PATENT OFFICE 2,605,283

P-ALKOXYBENZILIC ACIDS

Earl R. Bockstahler, Indianapolis, Ind., assignor to Allied Laboratories, Inc., Kansas City, Mo., a corporation of Delaware No Drawing. Application March 14, 1951, Serial No. 215,657

6 Claims. (Cl. 260—520)

The present invention relates to a new class of organic compounds and more particularly to p-alkoxybenzilic acids and to the processes of making them.

The new compounds of my invention comprise those represented by the following structural formula:

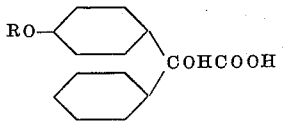

in which R is an alkyl group having from four to eight carbon atoms.

The following specific examples illustrate the preparation of the new compounds.

EXAMPLE 1

*Preparation of dl-p-n-hexyloxybenzilic acid*

A solution of 77 gm. of p-n-hexyloxybenzil in 800 cc. of ether was mixed with a solution of 19.8 gm. of potassium hydroxide in 160 cc. of 95% ethanol and allowed to stand for twenty-four hours with occasional shaking. The mixture was then shaken with 400 cc. of water. The water layer was separated, filtered, and acidified with hydrochloric acid. After long standing at room temperature, the oil which precipitated solidified. Recrystallization from petroleum gave a crystalline product which melted at 62–64° C.

EXAMPLE 2

*Preparation of dl-p-n-butoxybenzilic acid*

A solution of 25 gm. p-n-butoxybenzil in 285 cc. of ether was mixed with a solution of 7 gm. of potassium hydroxide in 57 cc. of 95% ethanol and allowed to stand for twenty-four hours with occasional shaking. The mixture was then shaken with 400 cc. of water. The water layer was separated, filtered, and acidified with hydrochloric acid. After long standing, the oil which precipitated solidified. Recrystallization from a mixture of petroleum ether and benzene gave a crystalline product which melted at 85–86° C.

EXAMPLE 3

*Preparation of dl-p-n-amoxybenzilic acid*

A solution of 12 gm. of p-n-amoxybenzil in 130 cc. of ether was mixed with a solution of 3.2 gm. of potassium hydroxide in 26 cc. of 95% ethanol and allowed to stand for twenty-four hours with occasional shaking. The mixture was then shaken with 200 cc. of water. The water layer was separated, filtered, and acidified with hydrochloric acid. After long standing the oil which precipitated solidified. Recrystallization from petroleum ether gave a crystalline product which melted at 90–91° C.

In addition, I have prepared the following compounds utilizing the same method illustrated in the specific examples: isobutoxybenzilic acid, M. P. 87–89° C., n-heptyloxybenzilic acid, M. P., 90–91° C., and octyloxybenzilic acid, M. P., 68–69° C.

The compounds of this invention are useful as intermediates in preparation of the new therapeutic agents claimed in my co-pending application, Serial No. 87,847, filing date, April 15, 1949, and titled "Diethylaminoethyl Alkoxybenzilates," now Patent No. 2,570,181.

The intermediates employed in the present invention can be prepared by the methods described by Earl R. Bockstahler and Donald L. Wright and published on page 6K of "Abstracts of Papers" of the 115th Meeting of the American Chemical Society at San Francisco, California, March 27 to April 1, 1949.

The present application is a continuation-in-part of my application Serial No. 103,950, filed July 9, 1949, now abandoned.

I claim:

1. A compound having the structure:

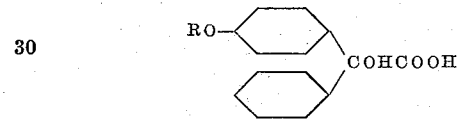

in which R is an alkyl group having from four to eight carbon atoms.

2. A compound having the structure:

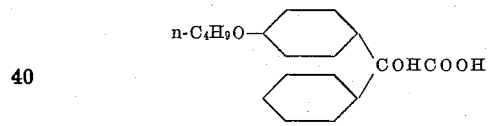

3. A compound having the structure:

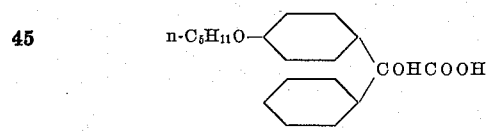

4. A compound having the structure:

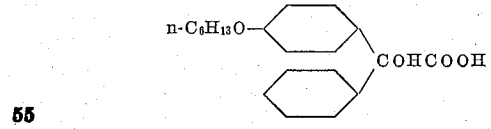

5. A compound having the structure:
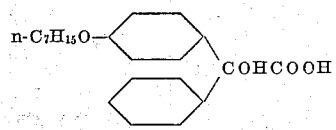
6. A compound having the structure:
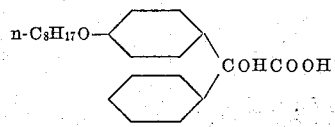
EARL R. BOCKSTAHLER.
REFERENCES CITED
The following references are of record in the file of this patent:
Bistrzycki et al.: Beilstein (Handbuch, 4th ed.), vol. 10, p. 445 (1927).
Jorlander: Beilstein (Handbuch, 4th ed.), vol. 10 Suppl., p. 218 (1932).
Asahina et al.: Beilstein (Handbuch, 4th ed.), 2nd Suppl., vol 10, p. 313 (1949).
Oliverio: Chem. Abstracts, vol. 34, col. 788 (1940).